Patented Jan. 17, 1928.

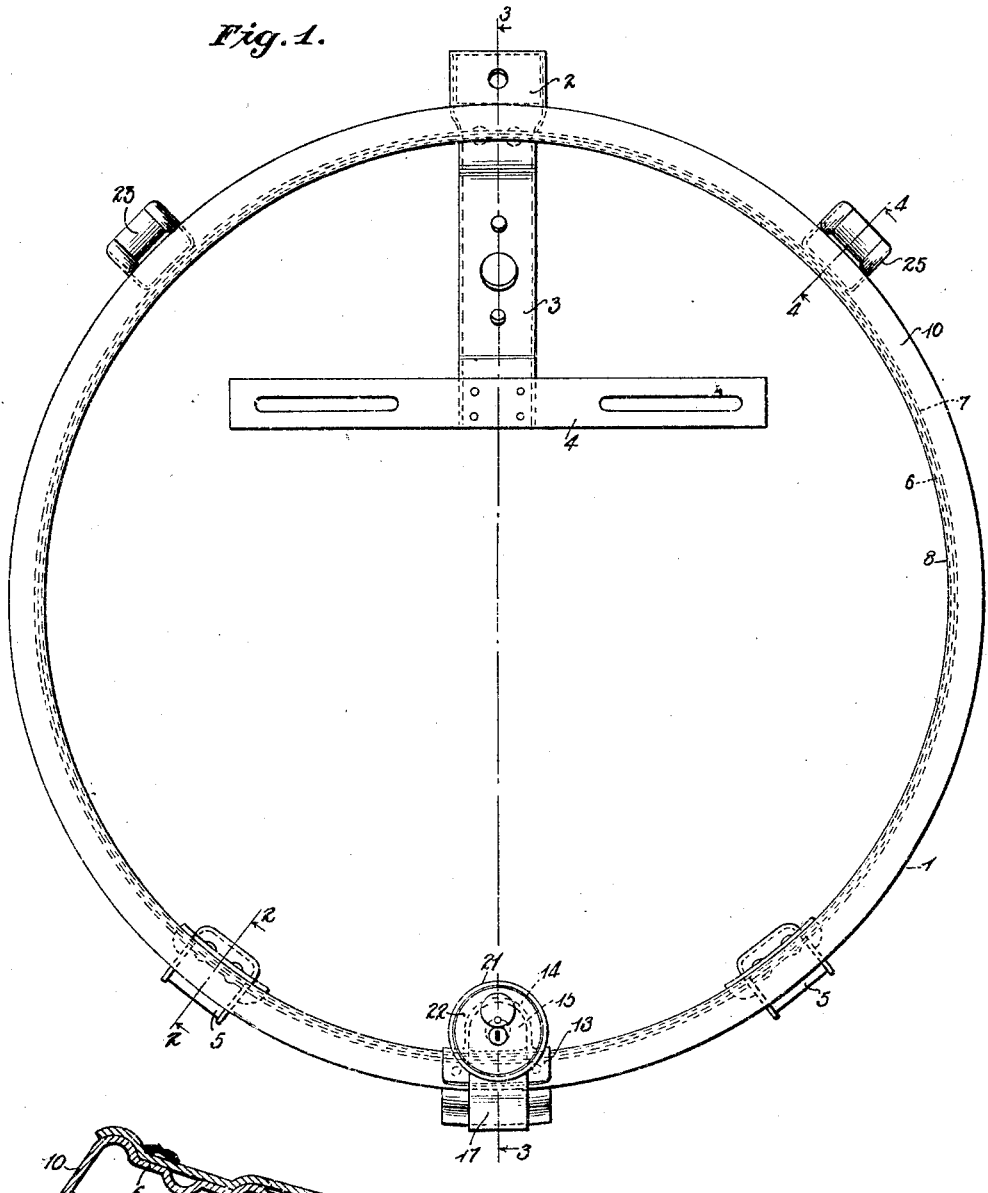

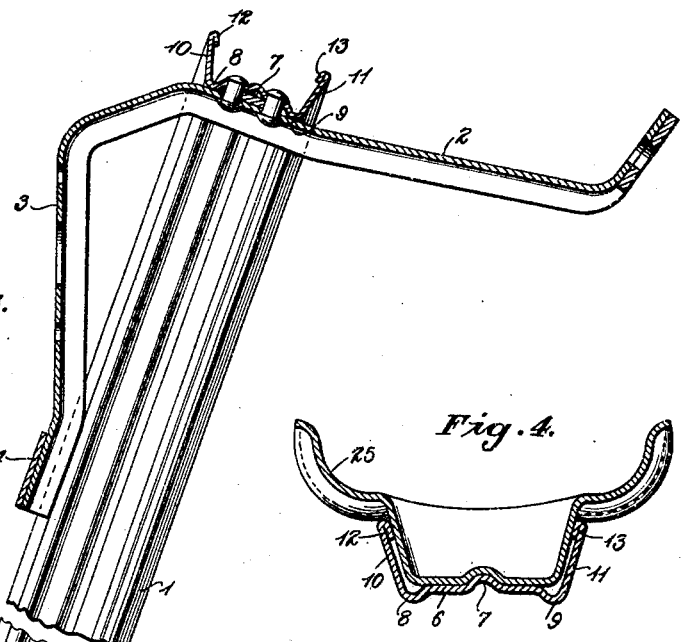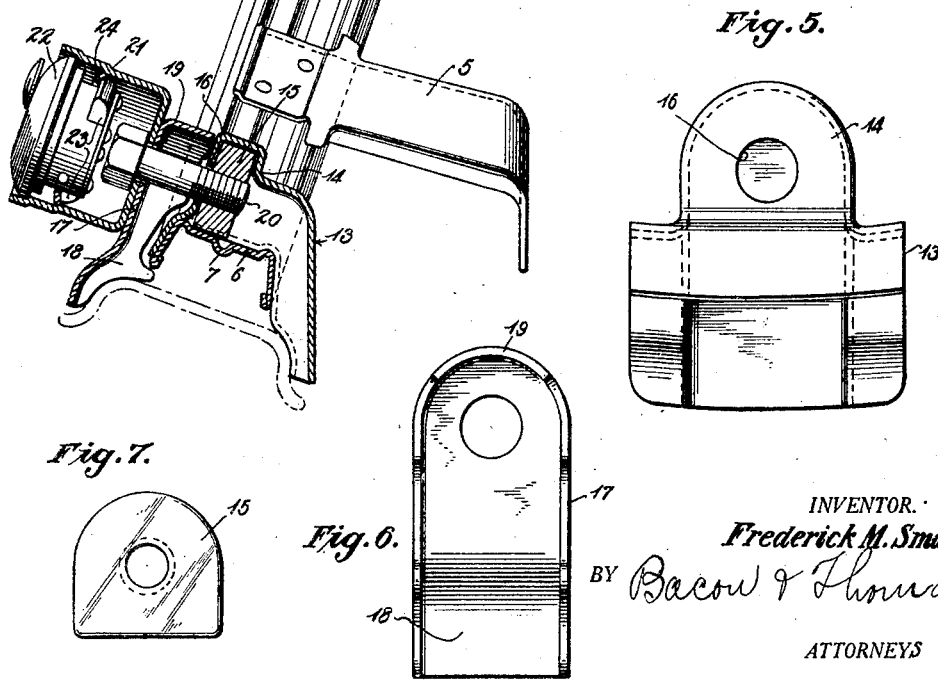

1,656,536

UNITED STATES PATENT OFFICE.

FREDERICK M. SMALL, OF YORK, PENNSYLVANIA, ASSIGNOR TO MARTIN-PARRY CORPORATION, OF YORK, PENNSYLVANIA, A CORPORATION OF DELAWARE.

SPARE-TIRE CARRIER.

Application filed February 9, 1927. Serial No. 166,914.

The invention relates to improvements in tire carriers preferably of the circular or ring type.

In the prior art it has been proposed to employ tire carriers of this general construction, but such devices have not been entirely satisfactory principally because the material from which they have been constructed has, either been of such thickness as to render them exceedingly expensive to manufacture as well as excessive in weight, or they have been constructed of material so thin that they are not capable of adequately sustaining the weight and shocks to which a tire carrier is constantly subjected.

It is an object of this invention to provide a carrier of the ring type which is constructed of relatively thin metal so as to be very light in weight and inexpensive to manufacture, yet so formed as to possess sufficient strength to adequately withstand all uses to which the carrier may be subjected. More specifically, the invention provides a carrier that is rolled or otherwise formed from a strip into a channel shaped ring having one or more reinforcing circumferential beads or corrugations to give it a most pleasing appearance and great strength and also preferably having the metal of the flanged end rebent to reinforce these flanges.

In the preferred embodiment of my invention I have shown three corrugations extending circumferentially around the base of the ring, but it will of course be understood that the number of corrugations employed will vary depending upon many conditions such as the thickness of the material used in the construction of the ring, the strength of the ring, etc.

In the accompanying drawings, I have shown a single embodiment of my invention for the purpose of illustrating the same, but it will be understood that various changes can be made without departing from the spirit of the invention or the scope of the appended claims.

In the drawings,

Figure 1 represents a rear view of the tire carrier,

Figure 2 is a cross-sectional view taken on line 2—2 of Figure 1 and showing the channel shaped formation of the ring.

Figure 3 is a sectional view taken on line 3—3 of Figure 1.

Figure 4 is a detailed cross sectional view taken on line 4—4 of Figure 1.

Figure 5 is a detailed view of one of the clamps.

Figure 6 is a view of a cooperating clamp, and

Figure 7 is a detailed view of the nut 15.

Referring now more particularly to the drawings, wherein like reference characters indicate corresponding parts, the numeral 1 designates the tire carrier which may be attached to the vehicle chassis or body in any approved manner. This carrier is of the circular or ring type. As herein shown the carrier is secured to the vehicle by the upper bracket 2, a continuation of which is bent downwardly in the open interior of the carrier 1 to provide the arm 3 adapted to support intermediate its ends a tail light or the like, while the lower end of this arm may support a license plate 4. The lower end of the carrier is supported to the vehicle by a pair of brackets 5 which may be riveted, welded or otherwise secured to the interior surface of the carrier ring.

Now referring more particularly to the construction of the carrier ring which forms my invention it will be observed that this ring is made from a relatively thin strip of metal. I have successfully used metal of a thickness of 18 gauge, which metal in the form of a strip is cold rolled to give the ring a U or channel shape. While I preferably cold roll the metal it will be understood that other operations may be resorted to in forming the metal into the shape the ring possesses and that metal of various thicknesses may be used although it is, of course, desirable to utilize metal of the least thickness possible, to economize both in weight and cost of manufacture.

The ring is preferably rolled or otherwise shaped to provide in the web or base 6 thereof a central annular corrugation or bead 7 that preferably extends substantially around the web of the ring. This corrugation gives to the relatively thin metal great strength. Likewise a pair of corrugations 8 and 9 may be formed in the web or base extending circumferentially therearound at or near each side of said web or base, which corrugations give to the relatively thin strip of metal adequate strength so that the finished ring will withstand very severe shocks and strains.

The upstanding ends or flanges 10 and 11 of the channel ring are preferably provided with rebent ends 12 and 13. The material from which the ring is formed is so rolled that the ends thereof extend downwardly parallel with the inner faces of the upstanding flanges 10 and 11 for the desired distances necessary to reinforce these flanges, which may be from a quarter of an inch upward. The rebent ends extending around the flanges not only give to the flanges great added strength, but also present smooth rounded surfaces on the flange portions of the ring.

A strip of material from which the ring is to be formed is rolled in the manner herein described and the ends of the strip are fastened together in any approved manner. In the present embodiment of the invention a locking bracket 13 spans and surrounds the meeting edges of the ring and this bracket is spot welded, or riveted to the adjacent ends of the ring, thereby holding said ends together. The bracket shown in this application is formed with a housing 14 receiving a nut 15 held therein against rotation, the outer face of the housing having a bolt opening 16 therein through which a locking bolt is permitted to enter the housing and engage the threads on the nut 15. A rim locking clamp 17 is preferably provided, the same being stamped or rolled from a sheet or strip of metal to provide the locking lug 18 and the base 19, which base fits against one side of the bracket 13 surrounding the ring. A fastening bolt 20 passes through an opening in the clamp by means of which the clamp is locked to the ring.

If a locking device is to be used with the carrier it may embody a bolt 20 the head of which is seated in a casing 21, while said casing is provided with an open end adapted to receive a locking plug 22. The locking lugs 23 of this plug engage a collar 24 in the casing so as to prevent removal of the plug by an unauthorized person. A suitable key will withdraw the dogs so that the plug may be removed. The construction of the locking plug and its associated mechanism forms no part of my invention but is merely shown and described in order that a complete ring carrier with its appurtenant parts may be illustrated.

The ring carrier also has a plurality of rim supports 25 that are of substantial channel shape and are riveted or otherwise secured to the ring. These brackets receive a positioned spare rim which rests directly thereon while the lower portion of the spare rim is engaged and supported by the locking assembly that has been hereinbefore discussed.

From the foregoing description it will be apparent that the carrier ring is constructed from a relatively thin strip of metal. Metal of a minimum thickness may be employed only because of the special construction of the ring, that is, by reason of the reinforcement given the thin metal due to the corrugations and rebent ends. The circumferential corrugations impart to the base or web of the ring great strength and it will, of course, be appreciated that any number of these corrugations can be used, although I have found that two or more corrugations will give the rim the desired strength when made from material of the thickness specified. It will be also appreciated that the corrugations in the base or web of the ring are most pleasing to the eye, giving the ring a very massive appearance even though it is composed of strip material of a minimum thickness. It will likewise be appreciated that by rebending the ends of the metal forming the ring at the flanges thereof, these flanges which are normally subjected to severe strains and stresses are adequately reinforced permitting more thin material or material that is so thin that it can be economically rolled, pressed or stamped to be used in the construction of a tire carrier having the required strength to withstand the usages to which a carrier is placed.

While I have pointed out that the strip of material from which the ring is produced is preferably cold rolled to give it the contour and form specified, it will be understood that the invention is not limited to such a method of making the ring. Any other approved method may be resorted to which is capable of giving a strip the form and contour to the rim herein disclosed, which enables relatively thin material to be used in the construction of tire carriers possessing great strength with a minimum cost.

Corrugations may be either inwardly or outwardly formed.

Having thus described the invention, what is claimed is:

1. A tire carrier for vehicles comprising a channel shaped ring having a base and two upstanding flanges, the said ring being of substantially circular formation and adapted to receive and support a demountable rim thereon, the base portion of the ring being provided with a circumferential, centrally disposed, corrugation, spaced rim seats secured to the channel ring, said rim seats being provided with corrugations cooperating with the corrugation in the ring.

2. A tire carrier comprising a channel shaped supporting ring having a base portion and upstanding flanges, said ring adapted to receive and support a demountable rim, a circumferential corrugation extending around the base of the ring and substantially centrally disposed with respect to the base, and a rebent fold of metal reinforcing the upper ends of the flanges of the ring, rim seats secured to the channel ring at spaced points thereon, said rim seats being provided with longitudinal corrugations interfittingly engaging the corrugation provided in the said ring.

3. A tire carrier for automobiles comprising a channel shaped ring made of sheet metal, the said ring having a base portion and two upstanding parallel flanges, the said ring being provided with a centrally disposed corrugation formed in the base thereof and a circumferentially disposed corrugation formed in the side of the base, said corrugations serving to materially strengthen the sheet metal channel shaped ring and imparting thereto a massive like appearance.

4. A tire carrier comprising a channel shaped ring constructed of sheet metal and having a base portion and upstanding flanges integral therewith, said ring being provided with a series of spaced annular corrugations formed in the base thereof, the said corrugations serving to materially strengthen the ring and impart to it a massive-like appearance.

5. A tire carrier comprising a ring constructed of sheet metal and having a base portion and two upstanding parallel flanges, a series of spaced annular corrugations formed in the base of the ring, means for securing said ring to the automobile, said means comprising a plurality of brackets provided with corrugations conforming substantially to some of the corrugations provided in the ring structure.

6. A tire carrier for automobiles comprising a channel shaped ring made of sheet metal and having a base portion and two upstanding parallel flanges, said ring being provided with a circumferentially disposed corrugation formed in each side of the base, said corrugations serving to materially strengthen the sheet metal channel shaped ring and imparting thereto a massive like appearance.

7. A tire carrier for automobiles comprising a channel shaped ring made of sheet metal and of substantially circular formation, said ring having a base portion and two upstanding parallel flanges defining a space therebetween and being provided with a circumferentially disposed corrugation visible when viewing the open interior of the ring and imparting thereto a massive like appearance, and spaced rim seats shaped to substantially conform to the shape of the channel shaped ring and having laterally extending portions engageable with the side beads of the supported demountable rim.

In testimony whereof I affix my signature.

FREDERICK M. SMALL.